United States Patent

[11] 3,614,231

| [72] | Inventor | Clyde C. Shaw |
| | | Los Altos Hills, Calif. |
| [21] | Appl. No. | 704,924 |
| [22] | Filed | Feb. 12, 1968 |
| [45] | Patented | Oct. 19, 1971 |
| [73] | Assignee | Coulter Electronics, Inc. |
| | | Hialeah, Fla. |

[54] OPTICAL AEROSOL COUNTER
6 Claims, 8 Drawing Figs.

[52] U.S. Cl. ............................................. 356/37,
250/218, 356/72, 356/102, 356/103, 356/208
[51] Int. Cl. ............................................. G01n 1/00,
G01n 21/00, G01n 15/02
[50] Field of Search ............................... 356/102–104,
207, 208, 72, 36–37; 250/218

[56] References Cited
UNITED STATES PATENTS

| 2,347,066 | 4/1944 | Shurcliff | 356/236 |
| 2,347,067 | 4/1944 | Shurcliff | 356/236 |
| 2,732,753 | 1/1956 | O'Konski | 356/103 X |
| 2,852,693 | 9/1958 | Hughes et al. | 356/179 X |
| 2,920,525 | 1/1960 | Appel et al. | 356/103 X |
| 3,039,355 | 6/1962 | Suter | 356/37 |
| 3,231,748 | 1/1966 | Haessler et al. | 356/103 |
| 3,248,551 | 4/1966 | Frommer | 356/103 X |
| 3,361,030 | 1/1968 | Goldberg | 356/103 |
| 3,398,286 | 8/1968 | Ford et al. | 356/103 X |

OTHER REFERENCES
Sinclair-Phoenix, Catalogue, 1958, 356/103

*Primary Examiner*—Ronald L. Wibert
*Assistant Examiner*—Warren A. Sklar
*Attorney*—Silverman & Cass ABSTRACT: An optical liquid or aerosol particle sensor of the kind in which a focused light beam is projected through a flow stream of suspended particles to determine the particle size and number concentration by measuring the scattered components of the focused light beam. A specularly reflecting or absorbing mask is located closely adjacent that portion of the flow stream intercepted by the focused light beam. This mask absorbs and specularly reflects the focused light beam and thus blocks off the illuminating light from the scattered light detection element. This mask possesses a reflecting surface which causes essentially all of the unabsorbed portion of the illuminated light to retrace its incoming path so that this part of the light beam is never received at the light measuring part of the aerosol sensor. The sensor may also include a housing having a highly reflective inner surface. The housing may be constructed to produce very nearly a 4 pi steradian collection system efficiency with respect to the scattered light.

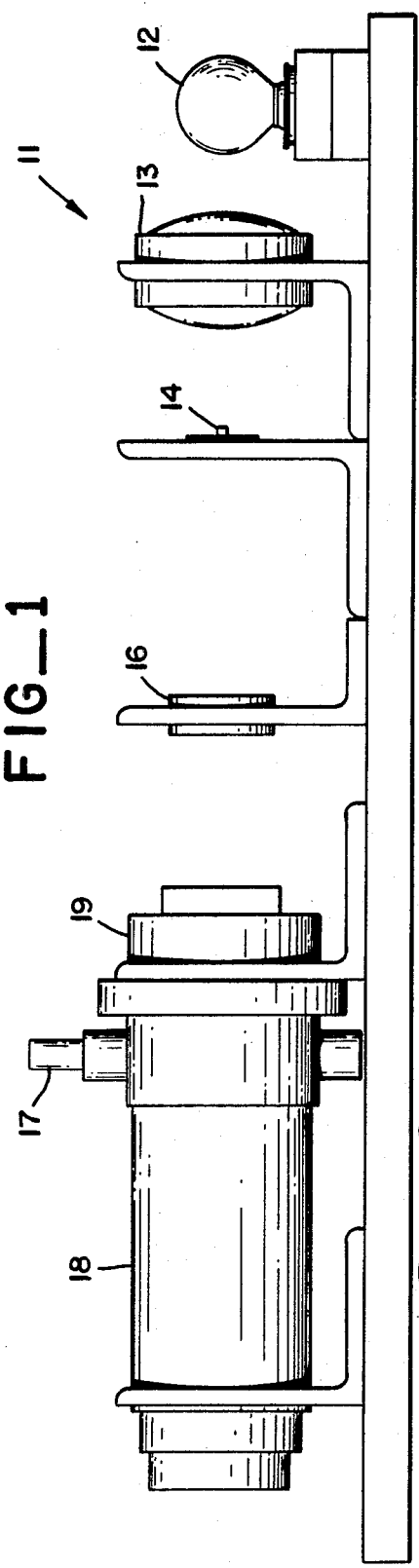
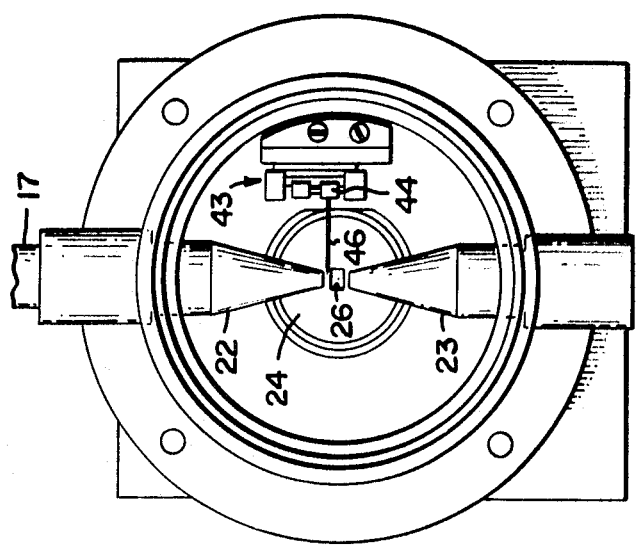
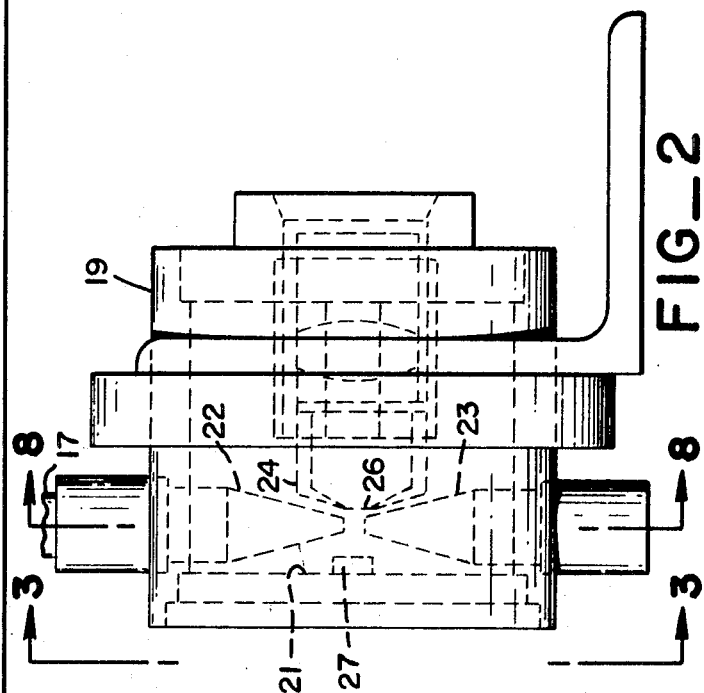

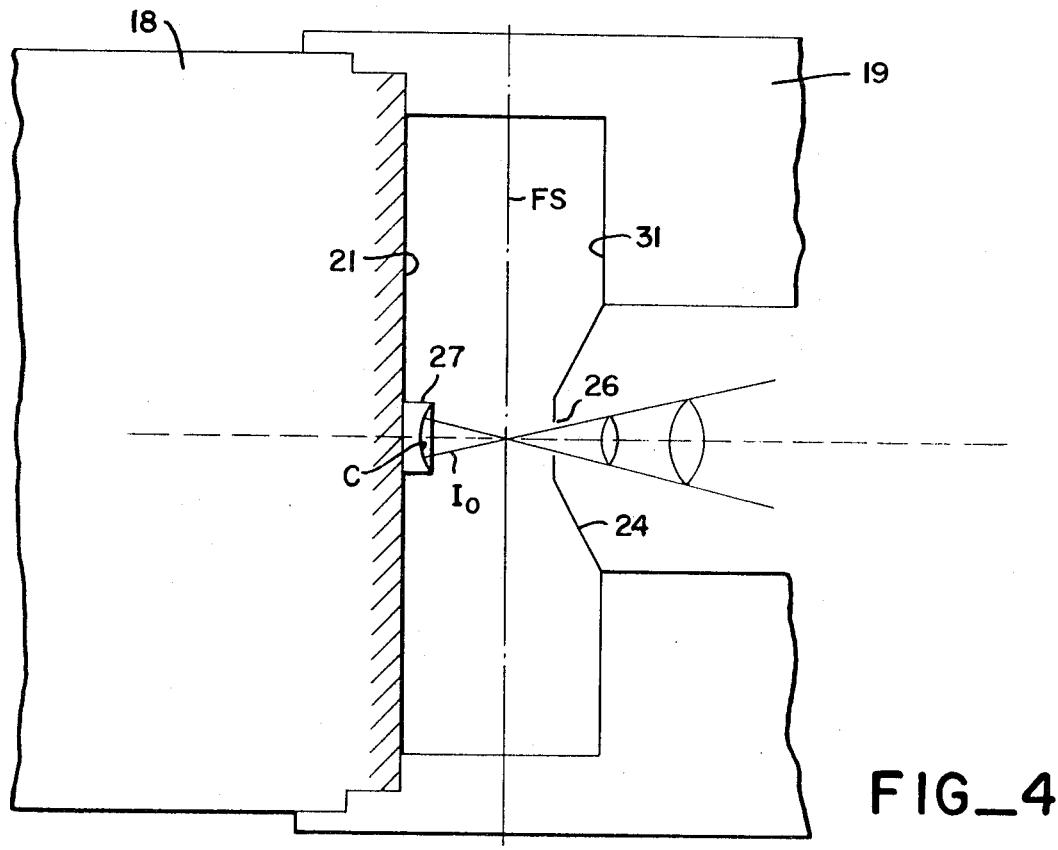
FIG_4
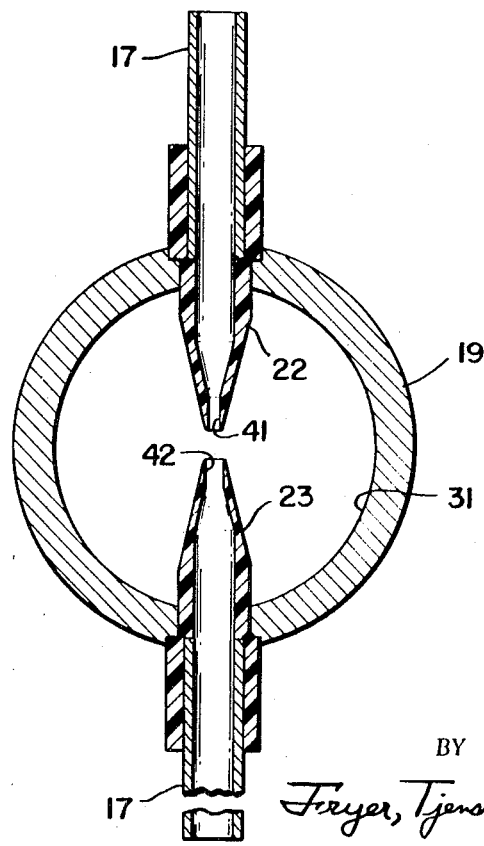
FIG_8
INVENTOR.
CLYDE C. SHAW

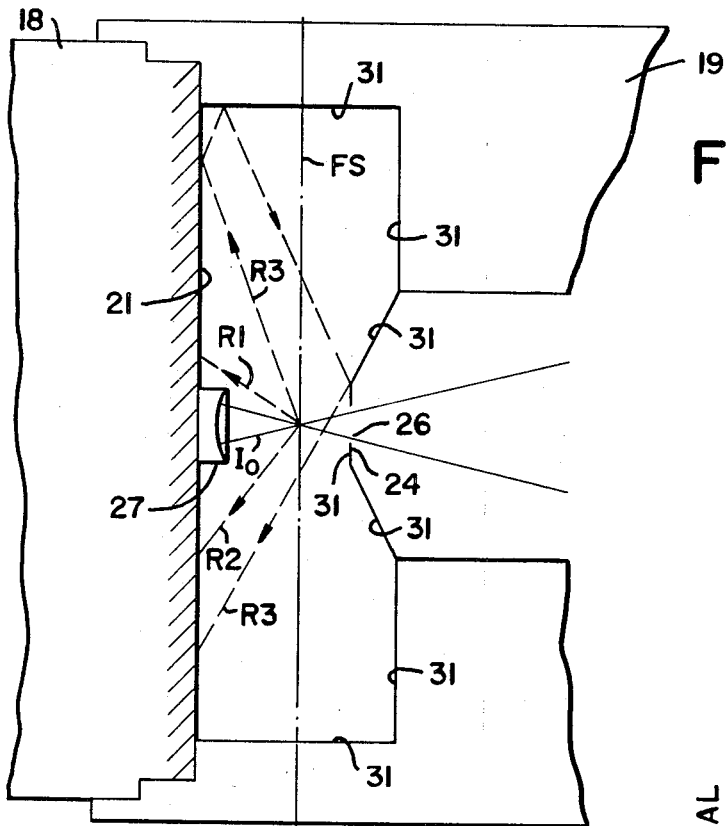
FIG_5
FIG_7
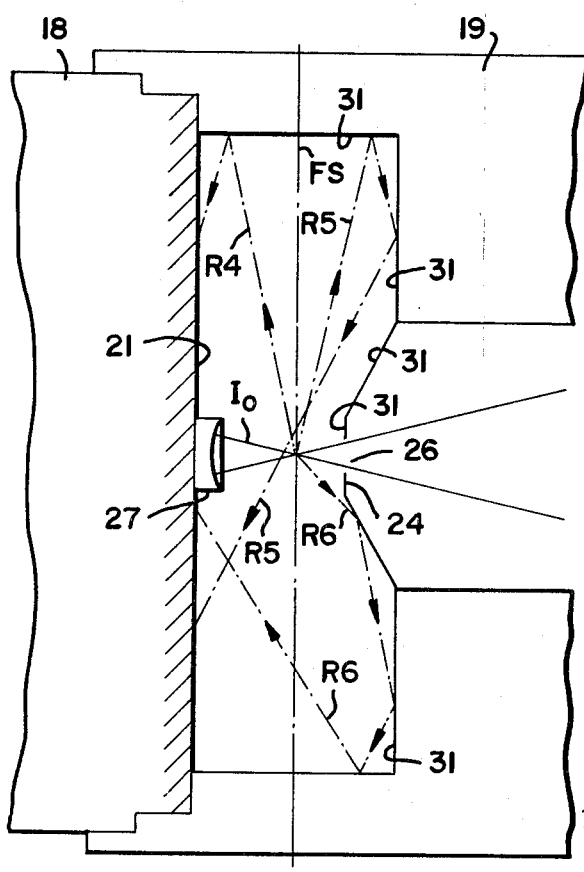
FIG_6

OPTICAL AEROSOL COUNTER

The present invention relates to either liquid or aerosol sensors and in particular to those sensors that operate on the principle of measurement of the amount of light which is scattered when an intense illuminating beam is projected through a flow stream of suspended particles.

The particles to be measured by this technique are suspensions of small solid or liquid materials in a fluid. These particles scatter and absorb a beam of light passing through the suspension. The extinction and the scattering of a beam of light passing through the suspension can be measured, and in recent years the theory, equipment and techniques for correlating the amount of light extinction and scattering with the particle size and concentration of particles have been worked out and developed to the point where accurate measurements can be made.

There are in general two basic techniques, light extinction and light scattering, for measuring the particle size and concentration by optical means. The extinction technique is the simpler of the two. However, the light-scattering technique is more versatile and exact. The measurement of scattered light can be used to count particles whose concentration in a sample may be too low to give an extinction reading that can be measured with sufficient accuracy.

The optical measurement of aerosol and liquid suspensions is useful in a wide variety of applications. It is useful in industrial process control, such as iron ore processing, cement grinding, and copper processing. In such process control applications, particle measurement can produce significant cost savings by eliminating overgrinding.

In pharmaceutical applications, the measurement of particle size is a useful tool in maintaining cleanliness levels and in avoiding cross-contamination.

Accurate measurement of particles is quite important in the clean room market —hospital operating rooms, semiconductor manufacturing facilities, and aerospace manufacturing facilities.

The accurate measurement of particles is useful in the medical field. Blood cell counts of both white and red blood cells can be made quickly and accurately by particle measurement. Bacteria counts can also be made by this measurement technique.

As noted above, the present invention has particular application to the optical measurement of particles by measuring the amount of scattered light.

In the light-scattering technique, the light striking a suspended particle is scattered in two ways. Part of the light is diffracted in a forward direction. Part of the light is reflected in other directions. By far the greater part of the light is diffracted. The intensity of the diffracted light can be of the order of magnitude of 40 times the intensity of the reflected light.

The illuminating beam is a relatively high-intensity beam, and only a relatively small part of the intensity of the beam is scattered by the diffraction and reflection noted above. Most of the beam passes through the suspension without ever hitting a suspended particle. The illuminating beam is a focused beam and the point of focus is incident normally to the direction of flow and is centered on the radial axis of the flow stream. Only the scattered light is of interest for purposes of making the measurement, and the unscattered light, because of its relatively high intensity, must not be transmitted to the light-measuring means. That is, if the unscattered light were transmitted to the light-measuring means, the intensity of the unscattered light would overpower the intensity of the scattered light to an extent such that the light measuring means would not be able to discriminate between the two kinds of light or to give an accurate indication of the amount or intensity of the scattered light.

The present invention makes use of the fact that most of the illuminating beam which passes through the suspension without being incident on a suspended particle is eliminated from the detection system by refocusing this unscattered light and causing this light to retrace its incoming path and thus be transmitted in a reverse direction out of the particle sensor. In the present invention, a photomultiplier tube is mounted with a light-receiving end axially aligned with the illuminating beam. A black specular mirror is mounted at the center of the tube end. The mirror has a curvature which is centered at the focal point of the illuminating beam so that the unscattered light hits the mirror and retraces its incoming path as described above. This construction provides a compact and efficient light-measuring arrangement, which does not require collection optics, and is a specific object of the present invention.

It should be noted that a highly reflective mirror may also be used in this system. However, more care is then required to effectively reduce background illumination, which arises from this mirror, to the point where sufficient sensitivity may be achieved with the sensor.

The present invention may also incorporate a reflecting housing which entirely encloses the light-receiving end of the photomultiplier tube, except for the opening for the illuminating beam. The interior of the housing is highly light reflective, and the housing is shaped to cause all of the scattered light which is reflected or diffracted at too great an angle to enter the photomultiplier tube on the first pass to be ultimately reflected, whether once or multiply, back to the tube end at an angle at which the light will enter the tube and thus be measured. This housing creates a highly efficient collection system which closely approaches a 4 pi steradian efficiency for the scattered light. This is a further specific object of the present invention.

The elements of the illuminating beam system that are used to focus the illuminating beam can cause some light scatter. The present invention locates a mask closely adjacent the part of the flow stream which is intercepted by the illuminating beam, and the mask is just large enough to pass the focused illuminating beam. The mask blocks off the stray light that has been scattered upstream of the mask by other elements of the illuminating system. This mask construction and location are further objects of the present invention.

The flow stream is introduced into the housing by flow tubes which cause a minimum of turbulence and hence very little recirculation of particles within the housing. The flow tubes are made by molding epoxy about the outside surface of a very smooth mandrel. The smoothness of the stream contacting surfaces of the flow tubes and the configuration of the flow tubes cause the flow tubes to act almost like a jet pump. These flow tubes are further specific objects of the present invention.

It is a further object of the present invention to use a tuning fork and tine mounted needle arrangement for calibrating the counter in terms of both particle size and number of counts.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation view of an aerosol counter constructed in accordance with one embodiment of the present invention;

FIG. 2 is an enlarged side elevation view of the photomultiplier tube cell housing of the aerosol counter shown in FIG. 1 and shows internal parts in phantom outline;

FIG. 3 is an end elevation view taken along the line and in the direction indicated by the arrows 3—3 in FIG. 2;

FIG. 4 is a fragmentary, enlarged, side elevation view of the interior of the cell housing and shows the incoming and outcoming light paths of the unscattered illuminating beam;

FIG. 5 is a view like FIG. 4, but shows the light paths of light diffracted by suspended particles;

FIG. 6 is a view like FIGS. 4 and 5, but shows the light paths of light which has been diffracted at too great an angle to impinge directly on the face of the photomultiplier tube and also the light paths of light that has been reflected by a suspended particle and subsequently re-reflected by the cell housing back to the photomultiplier tube;

FIG. 7 is a graph of a calibration curve used with a tuning fork calibration system shown in FIG. 3; and FIG. 8 is an end elevation view, in cross section, taken along the line and in the direction indicated by the arrows 8—8 in FIG. 2 and shows details of a flow tube construction of the present invention.

In FIG. 1, an optical liquid or aerosol particle sensor constructed in accordance with one embodiment of the present invention is indicated generally by the reference numeral 11.

The counter 11 includes a light source 12, a collecting lens system 13, an aperture 14 (which is dimensioned to pass just the image of the filament of the light source 12), a projection lens 16, flow tubes 17, a photomultiplier tube 18, and a cell housing 19.

The lamp 12, collecting lens 13, aperture 14, and projection lens 16 generate and focus an illuminating beam of light which is projected through a sample flow stream of suspended particles within the housing 19.

The sample flow of suspended particles is directed through the cell housing 19 by flow tubes 17, and the construction and mode of operation of the flow tubes will be described in greater detail below with reference to FIG. 8.

As best shown in FIGS. 4, 5 and 6, the photomultiplier tube 18 is mounted end-on (in axial alignment) with the axis of the focused illuminating beam. The flow tubes 17 have not been shown in FIGS. 4, 5 and 6 so that the ray paths of the scattered and unscattered light can be more clearly illustrated. The axis FS in these figures is the axis of the flow stream of suspended particles through the housing 19.

The photomultiplier tube 18 has a glass end surface 21. The light which is scattered, whether by diffraction or by reflection, when the illuminating beam strikes a suspended particle is transmitted through the glass end 21; and the intensity of this light is measured by electronic circuitry of the aerosol counter 11. The photomultiplier tube 18 thus forms a part of the light-measuring means which measure the amount of scattered light. The intensity of the scattered light indicates the particle size.

FIG. 2 shows the manner in which the structural features are operatively associated within the cell housing 19. The flow tubes 17 have molded epoxy tips 22 and 23 which are slightly spaced apart at their inner ends. The suspended particles flowing between the tips 22 and 23 are exposed to the illuminating beam.

The illuminating beam is projected through a mask 24 which has an opening 26 just large enough to pass the focused illuminating beam. The illuminating beam is focused on the particle stream at the axis FS of the stream.

The opening 26 blocks off stray, unfocused light that has been scattered upstream of the mask by other elements of the illuminating system.

The volume of the flow stream that is intercepted by the illuminating beam will be hereafter referred to as the critical volume.

The concentration of particles in most flow streams is so low that only a very small part of the illuminating beam projected through the critical volume comes in contact with a particle. The light that does not contact a particle in the critical volume is therefore of high intensity, as compared to the intensity of the scattered light, and will be hereafter referred to as the $I_0$ beam (see FIG. 4).

In accordance with the present invention, the black mirror 27 is mounted on the photomultiplier tube and has a curvature C which causes the $I_0$ beam to retrace its incoming path back out of the cell housing 19. This is best shown in FIG. 4. The curvature C of the mirror is centered at the critical volume on the axis FS. All of the unscattered light is therefore reflected back out of the cell housing without ever being seen by the photomultiplier tube 18. The only light that is transmitted to the photomultiplier tube is that light which has in some manner been scattered by a particle suspended in the flow stream, as will now be described.

By far the greater part of the light that is scattered by the suspended particles is light that is diffracted. The diffracted light continues in a forward direction, generally to the left as viewed in FIG. 5. Some of the diffracted light, as indicated by the light rays R1 and R2 in FIG. 5, strikes the end surface 21 of the photomultiplier 18 at an angle steep enough to cause the light to be transmitted directly through the end surface of the tube. However, some of the diffracted light strikes the end surface 21 at such a shallow angle, as indicated by the ray R3 in FIG. 5, that the light is reflected off the surface 21 rather than being transmitted through the surface 21.

The interior surface of the cell housing 19 may be made of a highly reflective material and is constructed in such a manner, as illustrated in FIGS. 5 and 6, that the ray R3 is reflected off the inner surface 31 one or more times until it strikes the surface 21 of the photomultiplier tube at an angle which permits the light to be transmitted into the tube.

As illustrated in FIG. 6, a diffracted ray of light R4 may be diffracted at an angle such that the light strikes the inner surface 31 of the cell housing before it strikes the photomultiplier tube end surface 21. The ray R4 is reflected, one or more times, by the cell housing until it also enters the photomultiplier tube.

Some of the light striking a suspended particle is reflected rather than diffracted, as indicated by the light ray paths R5 and R6 in FIG. 6. This reflected light is re-reflected, one or more times, by the reflective surface 31 until light passes into the photomultiplier tube where it is measured.

As best shown in FIGS. 5 and 6, the reflecting surface 31 completely encloses the end of the photomultiplier tube, except for the area of the aperture 26 in the mask. As a result, the housing 19 effects almost a 4 pi steradian collection system efficiency with respect to the scattered light. The housing acts substantially like a sphere in collecting and directing all of the scattered light into the photomultiplier tube.

The manner in which the cell housing 19 is associated with the illuminating system and the sample flow system not only produces a highly efficient light collection means for gathering and transmitting to the light-measuring means all of the scattered light (and only the scattered light), but this cell housing construction also permits a very compact arrangement. The photomultiplier tube is mounted end-on with respect to the illuminating beam, and no collection optics between the photomultiplier tube and the particle flow stream are required.

The manner in which the mirror 27 is combined with the other elements eliminates problems of transmission of unscattered light to the light-measuring means and thus permits this compact axial arrangement to be realized.

The aperture 26 effectively eliminates problems of transmission of stray light to the light-measuring means so that the light that is measured is only that which is scattered by the particles. As a result, the aerosol counter 11 is highly accurate.

The flow tube construction of the present invention also makes an important contribution to the accuracy of the aerosol counter. With reference to FIG. 8, it can be seen that the sample flow is physically unrestrained in the area between the tips 22 and 23. Any turbulence in the flow stream can cause some of the particles to become separated from the flow stream in this area. If this should happen, the particles could recirculate within the housing and, in the process of such recirculation, cause additional light scattering and produce an inaccurate reading.

In accordance with the present invention, the tips 22 and 23 are specially constructed to minimize turbulence in the flow stream. Each tip 22 and 23 is molded by casting epoxy on a mandrel. The outside surface of the mandrel is made very smooth so that the inner surfaces of the tips 22 and 23 are also very smooth. As a result, there is very little shearing of the particles out of the flow stream.

The injector tip 22 is formed in the shape of a nozzle as shown in FIG. 8 and has an opening 41 at its outlet end. The collector tip 23 is shaped like the tip 22, but is reversed in orientation; and the inlet opening 42 of the tip 23 is somewhat larger than the opening 41 of the tip 22.

The configuration of the tips 22 and 23, their location with respect to one another, and the size relationship of the openings 41 and 42 cause the tips to act almost as a jet pump, which further minimizes problems of recirculation of particles within the housing 19. The tubes 17 leading the sample flow stream to and from the tips 22 and 23 may be made of smooth wall stainless steel tubing.

When the particles are carried in a liquid, rather than a gaseous, flow stream, the tips 22 and 23 are replaced by a continuous and rectangular shaped flow tube having windows on the sides facing the mask 26 and the mirror 27. The windows are flat on the inside, but may be curved on the outside to increase the collection efficiency by acting as a lens.

As best shown in FIG. 3, the present invention incorporates a tuning fork and needle arrangement for calibrating the counter 11. A tuning fork, indicated generally by the reference numeral 43, has a needle 46 attached to one tine 44 of the tuning fork.

As illustrated in FIG. 3, the free end of the needle 46 extends toward the tips 22 and 23 of the flow tubes. In the at rest position indicated in FIG. 3, the free end of the needle 46 does not intercept the critical volume. However, when the tuning fork is energized, the tine 44 will cause the free end of the needle 46 to vibrate back and forth across the critical volume at a known frequency. Since the number of vibrations of the fork within the critical volume during a given period of time is known, the needle can be used to calibrate the aerosol counter 11 for number of counts. It can also be used as a secondary size calibration by comparing its pulse amplitude with those of standard particles whose sizes are known.

With reference to FIG. 7, the point on curve 46 represents the relationship between signal and particle size that should be produced on energization of the tuning fork 43. If the actual curve produced by the aerosol counter 11 during calibration is curve 47, appropriate adjustment of the counter 11 can be made to calibrate the counter. In some cases it is only necessary to adjust the intensity of the lamp 12 to bring the curve 47 into coincidence with the curve 46.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. In an optical particle sensor for determining the particle size and concentration of particles suspended in a flow stream by measuring and utilizing the scattering of a focused light beam projected through the flow stream, measuring means for measuring scattered light and including a photomultiplier tube having a tube surface positioned to receive the scattered light, flow means for directing a stream of suspended particles in front of the tube surface, means for illuminating a portion of the stream with a focused beam of light, and a reflector on the photomultiplier tube surface positioned and having a curvature with respect to the focused illuminating beam to reflect the unscattered and unabsorbed part of the focused illuminating beam back out through the flow stream in a manner such that said part of the beam retraces its incoming path and is never received at the measuring means.

2. An optical particle sensor for determining the size and concentration of particles suspended in a flow stream by measuring and utilizing the scattering of a focused light beam projected along an axis through the flow stream, said particle sensor comprising, photoresponsive measuring means having a light-receiving portion for measuring scattered light received thereat, a housing for enclosing the light-receiving portion of the measuring means and axially aligning said light-receiving portion with the axis of said light beam, flow means for directing a stream of suspended particles through the housing, means for focusing an axial beam of light on a portion of the stream within the housing, said housing entirely enclosing the light-receiving portion of the measuring means, except for an opening through which the beam is projected along its axis, and having an inner surface which is highly light reflective and which is shaped to reflect all scattered light not initially received by the measuring means back to the measuring means until it is received by the measuring means, whereby the housing effects almost a 4 pi steradian collection system efficiency with respect to scattered light and defines an enclosure in which there are no optic elements for collecting the scattered light, and a reflector located along the axis of the light beam and adjacent said light-receiving portion for reflecting back out through the flow stream the unscattered part of the light beam, such that that part of the focused light beam is never received by said light-receiving portion.

4. An optical particle sensor as defined in claim 3 wherein the mask is about ⅛ inch from the portion of the flow stream intercepted by the beam, and the reflector is optically upstream of said measuring means, is made of black epoxy and has about a ⅝-inch radius of curvature centered in the portion of the flow stream intercepted by the beam.

3. An optical particle sensor for determining the particle size and concentration of particles suspended in a flow stream by measuring and utilizing the scattering of a focused light beam projected through the flow stream, said sensor comprising, photoresponsive measuring means having a light-receiving portion for measuring scattered light received thereat and for providing an output for determining particle size and concentration, a housing for enclosing the light-receiving portion of the measuring means, means for directing a confined flow stream having therein suspended particles through the housing and in front of said light-receiving portion, means for focusing a beam of light on a portion of the stream within the housing, a mask located closely adjacent and optically upstream of the portion of the flow stream intercepted by the focused beam and dimensioned to pass only the focused beam along an axis toward the measuring means and into the flow stream, and a reflector located along the axis of said light beam and adjacent said measuring means, said reflector having a curvature to reflect the unscattered and unabsorbed part of the focused beam back out through the flow stream and the mask, so that the unaffected part of the beam retraces its incoming path and is never received at the measuring means.

5. An optical particle sensor for determining the particle size and concentration of particles suspended in a flow stream by measuring the scattering of a focused light beam projected through the flow stream, said sensor comprising, measuring means having a light-receiving portion for measuring scattered light received thereat, said measuring means providing an output proportional to the size and concentration of particles, a housing for enclosing the light-receiving portion of the measuring means, means for directing a flow stream having therein suspended particles through the housing, means for focusing a beam of light on a portion of the stream within the housing, a mask located closely adjacent and optically upstream of the portion of the flow stream intercepted by the focused beam and dimensioned to pass only the focused beam along an axis toward the measuring means and into the flow stream, and means for calibrating said sensor in terms of both particle size and number, said calibration means comprising a tuning fork and a needle connected to a tine of the tuning fork, said tine having a free end portion, which, during calibration, is vibrated by the tuning fork such that a particle size calibrated portion of said needle is vibrated in and out of the path of the focused light beam, in the location of that part of the flow stream intercepted by the light beam, to simulate a given particle size and particle number, whereby parameters such as light beam intensity and measuring means operation adjustments can be set to cause the measuring means output to match the simulated particle size and concentration.

6. In and optical particle sensor as defined in claim 1, means for calibrating said sensor in terms of both particle size and number, said calibration means comprising a tuning fork and a needle connected to a tine of the tuning fork, said tine having a free end portion which, during calibration, is vibrated by the tuning fork such that a particle size calibrated portion of said needle is vibrated in and out of the path of the focused light beam, in the location of that part of the flow stream intercepted by the light beam, to simulate a given particle size and particle number, whereby parameters such as light beam intensity and measuring means operation adjustments can be set to cause the measuring means output to match the simulated particle size and concentration.